United States Patent [19]

Morita et al.

[11] Patent Number: 5,437,048
[45] Date of Patent: Jul. 25, 1995

[54] PROGRAMMABLE CONTROLLER ACTING AS A MASTER STATION AND HAVING AUTOMATIC CONTROL OF INTERLOCK PROCESS BY USING AN OPERATION COMPLETE ADDRESS FLAG

[75] Inventors: Hideaki Morita; Teruyo Yamaguchi, both of Aichi, Japan

[73] Assignee: Mitsubishi Denki Kabushiki Kaisha, Tokyo, Japan

[21] Appl. No.: 283,147

[22] Filed: Aug. 1, 1994

Related U.S. Application Data

[63] Continuation of Ser. No. 26,244, Mar. 1, 1993, abandoned, which is a continuation of Ser. No. 654,991, Feb. 14, 1991, abandoned.

[30] Foreign Application Priority Data

Feb. 27, 1990 [JP] Japan .................. 2-46540

[51] Int. Cl.6 ............................. G06F 15/46
[52] U.S. Cl. ................... 395/800; 364/147; 364/221; 364/230.5; 364/260; 364/262.4; 364/DIG. 1
[58] Field of Search ............... 395/800, 775, 725, 425, 395/400, 325, 375, 275; 364/140–147

[56] References Cited

U.S. PATENT DOCUMENTS

| 3,728,693 | 4/1973 | Mackey et al. | 340/172.5 |
| 4,683,549 | 7/1987 | Takaki | 395/775 |
| 4,689,739 | 8/1987 | Federico et al. | 395/725 |
| 4,703,414 | 10/1987 | Inoue et al. | 364/147 |
| 4,807,185 | 2/1989 | Kamiya | 395/725 |
| 4,888,726 | 12/1989 | Struger et al. | 395/200 |
| 5,093,772 | 3/1992 | Senda et al. | 364/140 |

FOREIGN PATENT DOCUMENTS 0187677 7/1986 European Pat. Off.
3242631 5/1983 Germany.

OTHER PUBLICATIONS

Patent Abstracts of Japan, vol. 9, No. 265 (P-399) Oct. 23, 1985 & JP-A-60 114 908 (Mitsubishi Denki K.K.) Jun. 21, 1985.
Patent Abstracts of Japan, vol. 13, No. 358 (P-916) Aug. 10, 1989 & JP-A-01 118 902 (Fanuc Ltd.) May 11, 1989.

Primary Examiner—Alyssa H. Bowler
Assistant Examiner—Alpesh M. Shah
Attorney, Agent, or Firm—Sughrue, Mion, Zinn, Macpeak & Seas

[57] ABSTRACT

A system comprising a master station and one or plural slave stations connected in sequence wherein the master station utilizes a data processing module having an operation processor for cyclically executing a sequence program comprising a plurality of data link instructions. The execution of an individual data link instruction is protected by an interlock which remains in effect between the start of an instruction and its end. A macro instruction executable by the operating system is operative to automatically process the interlock, to avoid the necessity of including interlock processing in the sequence program itself.

7 Claims, 5 Drawing Sheets

FIG. 5A (PROCESSING EXECUTING FLAG (6b))
FIG. 5B (PROCESSING COMPLETE FLAG (6c))
FIG. 5C (OPERATION COMPLETE FLAG (6f))

FIG.10A
(PROCESSING EXECUTING FLAG (6b))

FIG.10B
(PROCESSING COMPLETE FLAG (6c))

PROGRAMMABLE CONTROLLER ACTING AS A MASTER STATION AND HAVING AUTOMATIC CONTROL OF INTERLOCK PROCESS BY USING AN OPERATION COMPLETE ADDRESS FLAG

This is a Continuation of Application No. 08/026,244 filed Mar. 1, 1993 now abandoned, which is a Continuation of Application No. 7/654,991 filed Feb. 14, 1991, now abandoned.

FIELD OF THE INVENTION

The present invention relates to a process of controlling a programmable controller acting as a master station for transferring data to and from a slave station.

DESCRIPTION OF THE BACKGROUND ART

Figure 8:
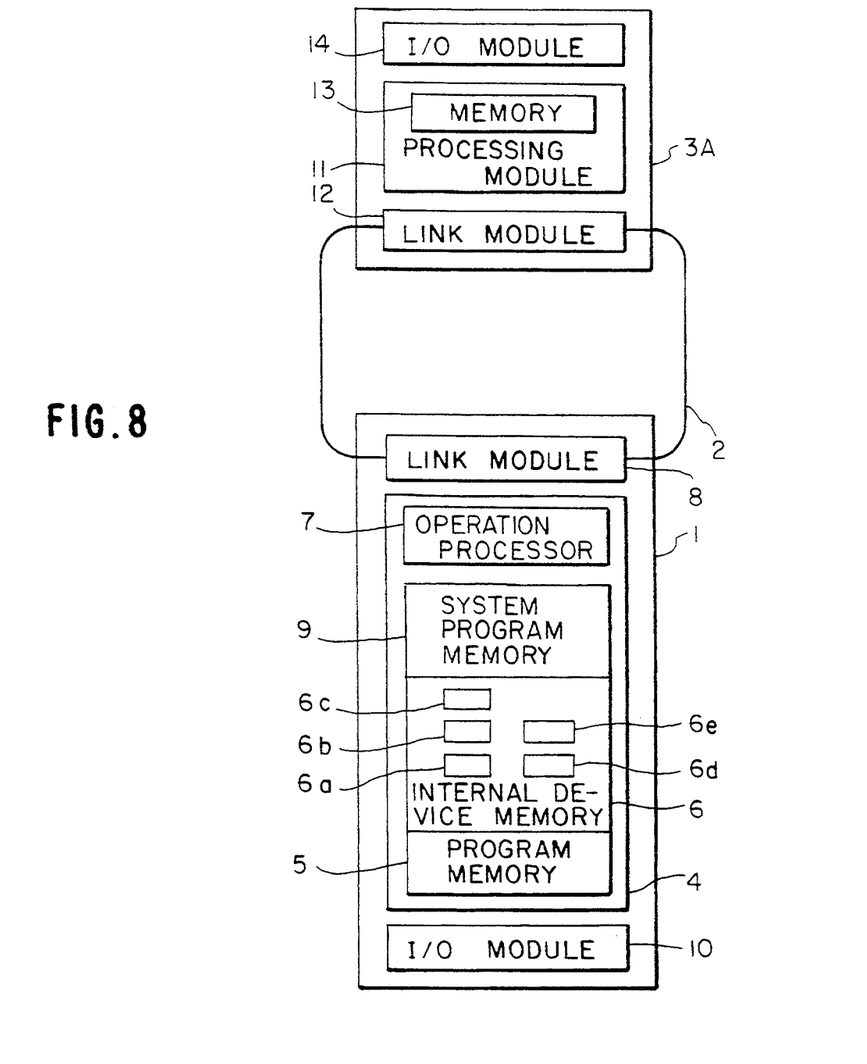
FIG. 8 illustrates the overall configuration of a programmable controller and a slave station to which a conventional programmable controller controlling process is applied.

FIG. 8 shows an example of an overall configuration of a programmable controller having a slave station 3A, to which a programmable controller controlling process of the background art is applied. A master station 1 is connected via a link cable 2 to slave station 3A. A central data processing module 4 provided in the master station 1 utilizes a program memory 5 for storing sequence programs. An internal device memory 6 is also provided in the central data processing module 4, and includes a link register 6a for holding information identical to that transmitted on the link cable 2, a register for storing PROCESSING EXECUTING flag 6b for indicating that data transfer to and from a slave station, e.g. 3A, is being conducted, a register for storing a PROCESSING COMPLETE flag 6c that is set when the data transfer to and from the slave station 3A, is complete and is automatically reset after a sequence program has been run twice, and registers for storing flags 6d and 6e that are required to execute a data link instruction. The processing module 4 further includes an operation processor 7 for running the sequence program sequentially and a system program memory 9 for storing an operating system and other programs for operating the central data processing module 4. A link module 8 is provided in the master station 1 between the link cable 2 and the central data processing module 4 for converting information transmitted by the link cable 2 into information acceptable by the central data processing module 4 as well as converting information in the central data processing module 4 into information transmittable by the link cable 2. An I/O module 10 is for controlling a unit to be controlled (not illustrated) that is connected to the master station 1.

In the slave station is at least one processing module 11 for transferring data to and from the central data processing module 4 in the master station 1. A link module 12 is provided between the processing module 11 and the link cable 2 for converting information transmitted by the link cable 2 into information acceptable by the processing module 11 as well as converting information in the processing module 11 into information transmittable by the link cable 2. A memory 13 is provided in the processing module 11, as well as an I/O module 14 for controlling a unit to be controlled (not illustrated) that is connected to the slave station 3A.

Figure 9:
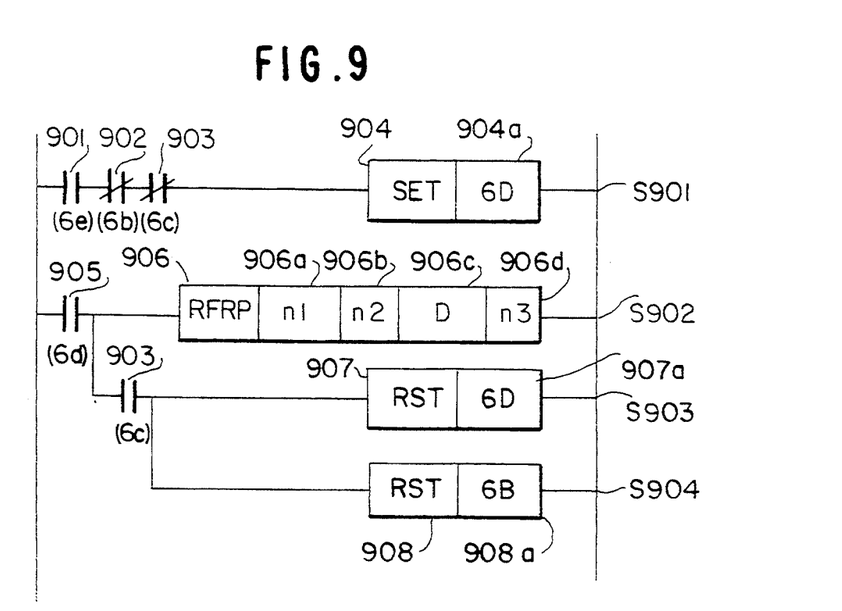
FIG. 9 illustrates a conventional program written in ladder language for executing an RFRP instruction.

FIG. 9 shows a conventional program in ladder form for executing an RFRP instruction. The RFRP instruction causes data to be received by the master station via the link cable from a slave station. A corresponding instruction is RTOP, which causes data to be transmitted by the master to a slave station. The RFRP instruction in FIG. 9 is an example of a conventional program for transferring data between the master station 1 and slave station 3A. In the ladder notation, the state symbol ∥ indicates a "contact A" state condition and the state symbol ∥ indicates a "contact B" state condition for the execution of an identified function.

Referring to FIG. 9, in a first program step S901 the state symbol 901 shows an active state condition for the START flag 6e that is provided in the internal device memory 6. The flag is set in the active state in order to initiate execution of the RFRP instruction in accordance with a program in the processing module 11. The inactive state condition of the PROCESSING EXECUTING flag 6b, and the inactive state condition of the PROCESSING COMPLETE flag 6c are shown by symbols 902 and 903, respectively. Thus, when the START flag 6e is reset, the PROCESSING EXECUTING flag 6b is in the set state, and the PROCESSING COMPLETE flag 6c is in the reset state, all of the conditions precedent to the execution of step S901 are satisfied. As a result, a 6D SET instruction 904 for setting a START CONDITION can be executed. This START CONDITION ESTABLISHING flag 6d is stored at an address indicated by 6D (904a) in the internal device memory 6.

Proceeding to step S902, the state symbol 905 indicates the active state of the START CONDITION ESTABLISHING flag 6d. When the START CONDITION ESTABLISHING flag 6d is set as a result of step S901, the condition precedent to execution of step S902 is satisfied and RFRP instruction 906 is executed. Since the PROCESSING EXECUTING flag 6b and the PROCESSING COMPLETE flag 6c are stored at addresses which depend on the hardware configuration, it is necessary to check the hardware configuration and specify calculated addresses in the sequence program when performing a read or write. The RFRP instruction 906 has operands n1 (906a), n2 (906b), n3 (906d) and D (906c). The instruction is used to transfer data from a particular slave station 3 to the master station 1 via the link cable 2. The instruction identifies the number of words, n3 (906d), starting at address n2 (906b) in the memory 13 of the processing module 11 of a slave station identified by n1 (906a), which are to be transferred to positions starting at address D (906c) of the link register 6a provided in the internal device memory 6 of the central data processing module 4 in the master station 1. When the transfer from slave to master according to this instruction has been completed, the PROCESSING COMPLETE flag 6c is set. As a result, the input conditions of steps S903 and S904 are satisfied, and a 6d reset instruction 907 and a 6b reset instruction 908 are executed. Address 6D (907a) identifies the location at which the START CONDITION ESTABLISHING flag 6d is stored, and address 6B (908a) identifies the location at which the PROCESSING EXECUTING flag 6b is stored.

Figure 10A:
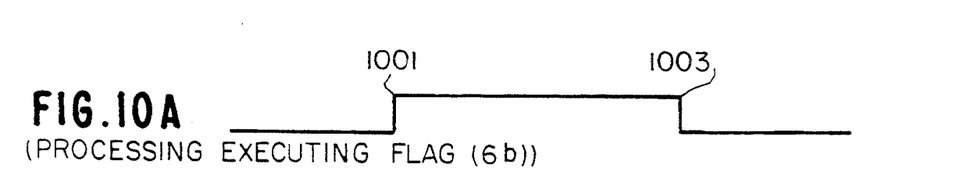
FIG. 10 is an operation timing chart of a processing executing flag and a processing complete flag in the conventional system.
Figure 10B:
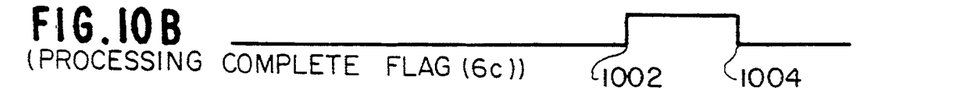

The operation of the ladder language program shown in FIG. 9 may be described with reference to a timing chart illustrated in FIGS. 10A and 10B. When the RFRP instruction 906 is executed at step S902, the PROCESSING EXECUTING flag 6b is set at a point (1001) shown in FIG. 10A. This prevents execution of step S901 again until flag 6b is reset. When data transfer from the processing module 11 to the master station 1 is complete, the PROCESSING COMPLETE flag 6c is set at a point 1002 shown in FIG. 10B. When the PROCESSING COMPLETE flag 6c is set at step S903 in FIG. 9, the 6D RESET instruction 907 is executed, the START CONDITION ESTABLISHING flag 6d is reset, the 6B RESET instruction 908 is executed at step S904, and the PROCESSING EXECUTING flag 6b is reset at point 1003 shown in FIG. 10A. The PROCESSING COMPLETE flag 6c is automatically reset at a point 1004 after the PROCESSING EXECUTING flag 6b is reset, as shown in FIG. 10B.

As is clear from the above explanation, flags 6b and 6c act as interlock conditions that assure that there is no overlap in the execution of program instructions. Thus, until flags 6b and 6c are both reset, the initial conditions of instruction S901 cannot be met, preventing further execution of that instruction until the current instruction has been completed. If instructions subsequent to those shown in S901–S904 are provided with initial conditions like those in S901, an effective step-by-step interlock can be achieved.

However, the aforementioned process has disadvantages in that it is required to check whether or not the operation of the processing module 11 is complete in the sequence program itself. Interlock processing has to be performed in the sequence program itself rather than by the operating system (OS). Because they serve interlock functions, it is necessary to check the PROCESSING EXECUTING flag 6b and the PROCESSING COMPLETE flag 6c, the addresses of which depend on several factors including the hardware configuration and the processing module loading position, and to specify these addresses in the sequence program. When data transfer is made between the master and slave stations, using the RTOP or RFRP instructions, it is necessary to write an interlock into the processing program, as shown in FIG. 9, in order not to execute an instruction for data transfer with the slave station when one data transfer is already taking place.

SUMMARY OF THE INVENTION

It is, accordingly, an object of the present invention to overcome the disadvantages in the prior art process by providing a programmable controller controlling process which will not require an interlock processing program to be written and the addresses of the flags, depending on the hardware configuration, to be specified in the program, and which will ensure ease of program creation and maintenance.

The foregoing object is accomplished by providing a process of controlling a programmable controller, acting as a master station and equipped with an operation processor for executing a sequence program cyclically, an operation complete flag memory for storing an operation complete flag indicating completion of an operation specified by a data link instruction included in the sequence program, an operation complete flag address memory provided in correspondence with each slave station for storing address information of the operation complete flag memory, and a communication entry memory provided in correspondence with each slave station for entering information indicating that communication is being made with a relevant slave station. The program controller comprises a means for recording the address information of the operation complete flag memory specified in the sequence program into the operation complete flag address memory corresponding to the relevant station, a means for entering the communicating information into the communication entry memory corresponding to the relevant slave station, and a means for executing a data link instruction in transferring data to or from the relevant slave station connected with the master station by executing the data link instruction. The program controller also has a means for setting a flag at a corresponding address in the operation complete flag memory in accordance with address information recorded in the operation complete flag address memory on completion of the operation started by the data link instruction. Finally, the program controller has a means for resetting the flag of the operation complete flag memory and erasing the communicating information entered in the communication entry memory after execution of one or more cycles of the programmable controller.

According to the present invention, when the programmable controller employed as the master station executes the data link instruction to transmit data between the master station and the slave station, the address information of the operation complete flag memory specified beforehand in the sequence program is recorded into the operation complete flag address memory, the communicating information indicating that communication is being made with the relevant slave station is entered into the communication entry memory provided in correspondence with each slave station, and when the data link instruction is executed and the operation started by the data link instruction is complete, the flag at the corresponding address in the operation complete flag memory is set in accordance with the address information recorded in the operation complete flag address memory. After one or more cycles of the programmable controller is executed, the flag of the operation complete flag memory is reset and the information entered in the communication entry memory is erased.

BRIEF DESCRIPTION OF THE DRAWINGS

In the foregoing drawings, like reference characters designate like or corresponding parts throughout the several views.

DESCRIPTION OF THE PREFERRED EMBODIMENTS

Figure 1:
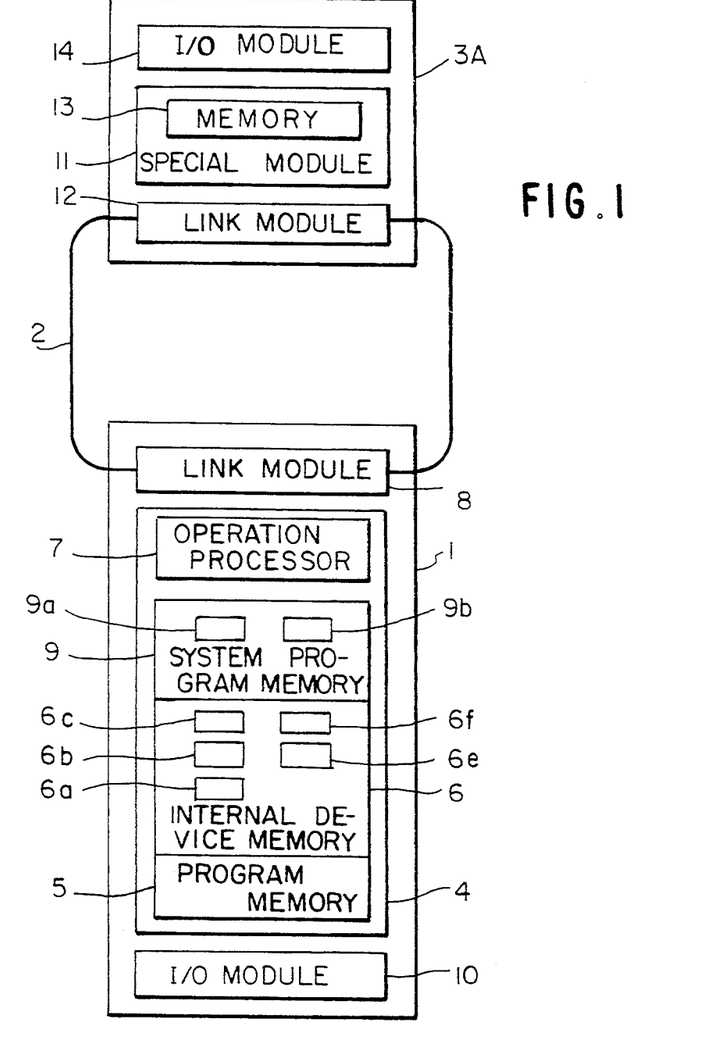
FIG. 1 illustrates an overall configuration of a programmable controller and a slave station to which one embodiment of the present invention is applied.

An embodiment of the present invention may be described with reference to FIG. 1, which is an overall configuration diagram of a programmable controller to which the present invention is applied. The overall configuration in FIG. 1 is identical to that of the conventional configuration shown in FIG. 8, with the exception of storage locations for additional information in the internal device memory 6 and the system program memory 9. Specifically, memory 6 further includes an OPERATION COMPLETE flag memory 6f and memory 9 includes a communications entry memory 9a and an OPERATION COMPLETE flag address memory 9b.

Figure 2A:
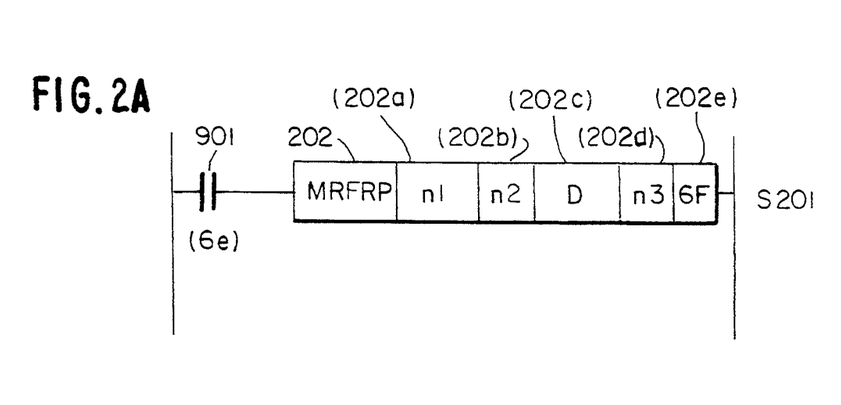
FIGS. 2A and 2B provide a program example of an MRFRP instruction written in ladder language in one embodiment of the present invention.

FIG. 2A illustrates a program written in ladder diagram form for executing in a single step S201 an "MRFRP" instruction 202. The MRFRP instruction causes the master station 1 to receive data from a slave station 3 via the link cable 2 and is thus functionally the same as the prior art sequence of four instructions seen in FIG. 9. A similar instruction MRTOP will cause the master station 1 to transmit data to a slave station 3 via the link cable 2. The designation of the instruction with an "M" indicates that there is a "macro" function. In particular the macro function in the present embodiment will cause the OS to process the interlock flags 6b and 6c automatically. Referring to FIG. 2A, symbol 901 shows a START flag 6e which it is set for executing the MRFRP instruction 202. When the START flag 6e is set, the input condition of step S201 is established and the MRFRP instruction 202 is executed. Operands n1 (202a), n2 (202b), D (202c) and n3 (202d) of the MRFRP instruction 202 have the same meanings as those of the RFRP instruction 906 in the conventional process. The address 6f identifies a memory location (202e) for storing an OPERATION COMPLETE flag 6f for indicating whether or not the operation of the MRFRP instruction 202 is complete. The OPERATION COMPLETE flag 6f is referenced by other instructions in the sequence program in order to identify whether or not the predetermined operation by the MRFRP instruction 202 is complete, and may be located at any arbitrary memory location.

The single step S201 in FIG. 2A is equivalent to the four steps (S901 to S904) in FIG. 9 of the conventional process. Whether or not the operation of the relevant instruction is complete may be checked simply by executing an OPERATION COMPLETE flag reference instruction which refers to the OPERATION COMPLETE flag 6f stored at address 6F. As a result, it is not necessary to refer, in the sequence program, to the PROCESSING EXECUTING flag 6b and the PROCESSING COMPLETE flag 6c, whose addresses depend on the hardware configuration and loading position, in order to determine the completion of an instruction, as required by the conventional process illustrated in FIG. 9.

Figures 2B, 3:
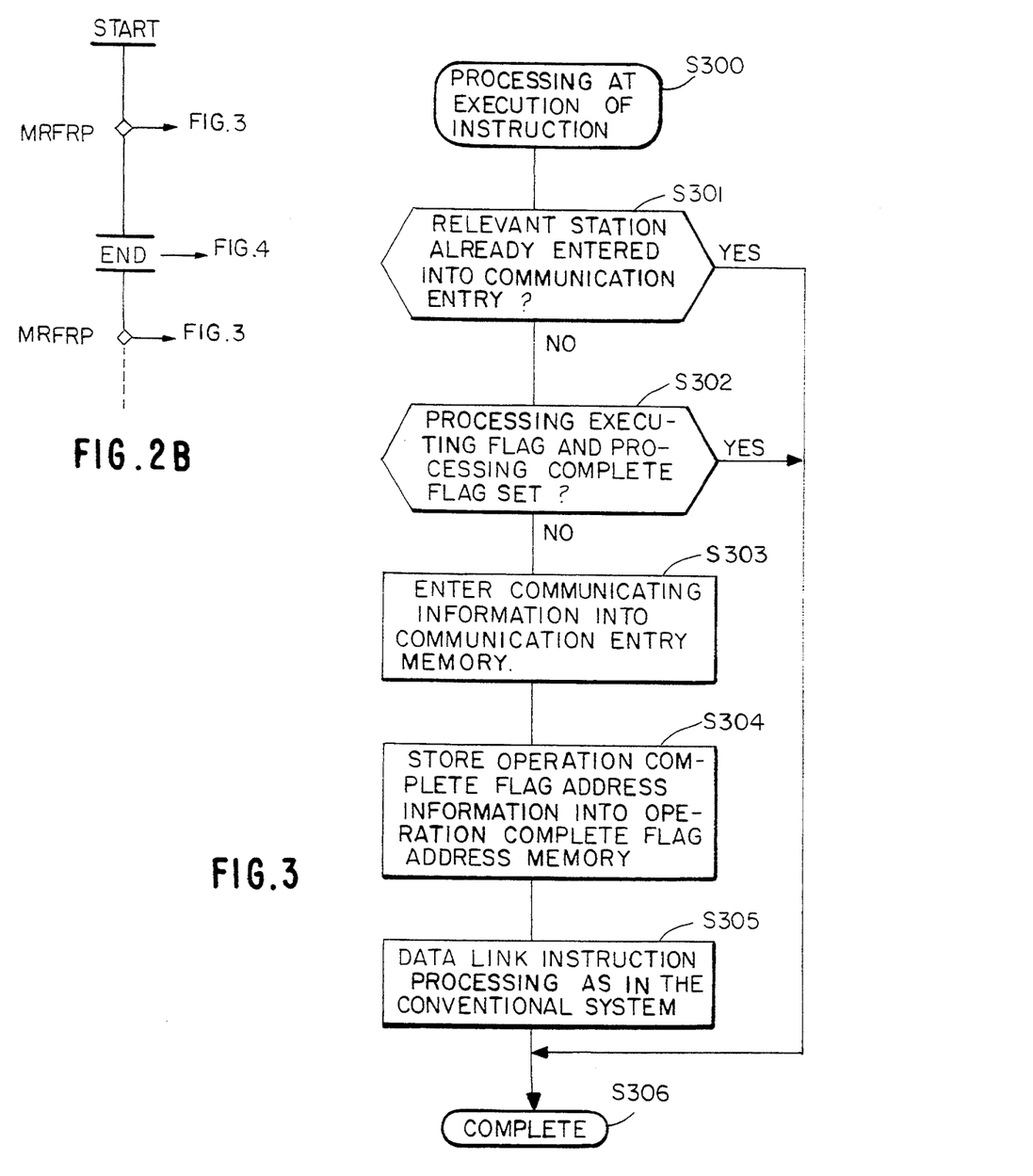
FIG. 3 is an operation flowchart of an operating system for executing the MRFRP instruction in one embodiment of the present invention.

FIG. 2B illustrates the basic instruction processing that is conducted with the use of the macro instruction of the present invention, beginning with a START command from the master station and ending with an END command. Several such processing functions are conducted in series in a sequence program, and overlap is avoided.

Figure 6:
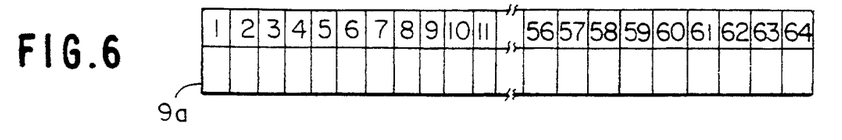
FIG. 6 illustrates a communication entry memory in one embodiment of the present invention.

FIG. 3 is an operation flowchart for an operating system, starting from step S300, for executing the MRFRP instruction 202, as an example of the instruction shown in FIG. 2 for transferring data between the master station 1 and slave station. In the process, the central data processing module 4 runs the sequence program repeatedly. In FIG. 3, step S301 checks whether or not the identity of a processing module 11 of a slave station 3A...3N has been entered into the communication entry memory 9a provided in the system program memory 9 in master station 1. This entry is made by setting a bit in the communication entry memory 9a corresponding to one of a plurality of processing modules 11. Memory 9a has a bit location corresponding to each unit in the network that communicates with the central data processing module 4 in the master station 1. As shown in FIG. 6, up to 64 units can be accommodated in this particular system, though there is no practical limit.

Figure 7:
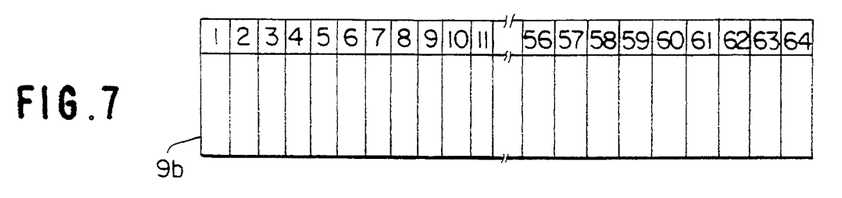
FIG. 7 illustrates an operation complete flag address memory in one embodiment of the present invention.

If the identity of a specific processing module 11 already has been entered in memory 9a, it is concluded at step S301 that the processing module 11 is already operating. Hence, the MRFRP instruction 202 is terminated at step S306 without any operation. If it is determined that the identity of a specific processing module 11 has not been entered in memory 9a, the process proceeds to the next step S302, which checks the PROCESSING EXECUTING flag 6b and the PROCESSING COMPLETE flag 6c, which are the same as those in the conventional process of FIG. 9. If both flags have already been reset, indicating the absence of an interlock condition, execution progresses to the next step S303, which enters into the communication entry memory 9a communication information indicating that the processing module 11 has started operation. At step S304, an address of the OPERATION COMPLETE flag 6f in the processing module 11 is then stored in the OPERATION COMPLETE flag address memory 9b provided in the system program memory 9. This allows the OPERATION COMPLETE flags 6f to be stored in respective locations that correspond to each of the units that communicate with the central data processing module 4, as shown in FIG. 7 where again up to 64 units can be identified. Then, at step S305, the operation performed is the same as that of the RFRP instruction 906 shown in FIG. 9 in the conventional process. Specifically, as shown in FIG. 10, at the point 1001 the PROCESSING EXECUTING flag 6b is set and data transmission from the processing module 11 in the slave station to the central data processing module 4 in the master station 1 is initiated. When the data transmission is complete, execution progresses to the next step in the sequence program.

If the PROCESSING EXECUTING flag 6b or the PROCESSING COMPLETE flag 6c has not yet been reset and a previously executed operation of an instruction for the processing module 11 is not complete, the program advances to step S306 and the process is terminated without any execution of the new instruction. The operation then progresses to the next step (not shown) in the sequence program.

Figure 4:
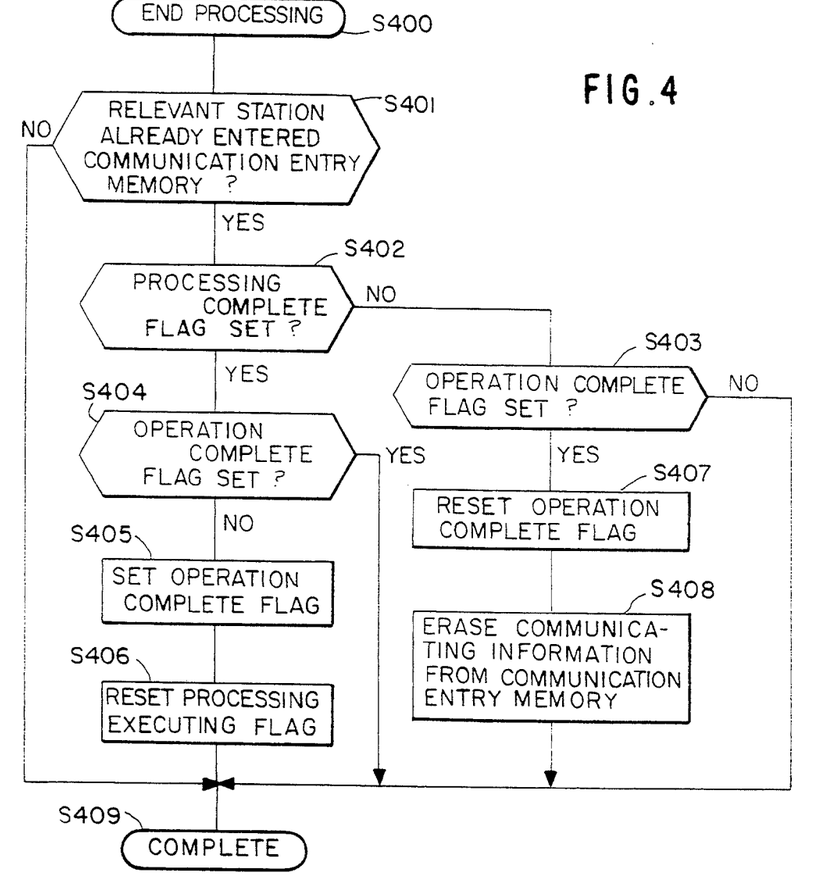
FIG. 4; is an operation flowchart of an operating system for performing END processing for the MRFRP instruction in one embodiment of the present invention.

FIG. 4 is an operation flowchart of the operating system in an END processing mode, indicated by step S400. The mode is performed when one cycle of the sequence program is terminated in a process in which the central data processing module 4 runs the sequence program repeatedly. At step S401, a check is made of whether the identity of a processing module 11 has been entered at step S303 in FIG. 3. Since no instruction is being executed for the processing module 11 if there has not yet been an entry, END processing is not required and is terminated at step S409 without any execution.

Figures 5A, 5B, 5C:
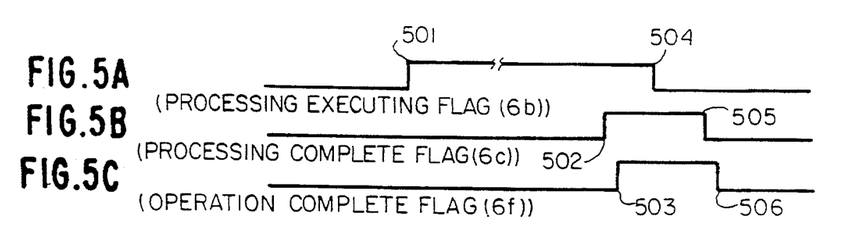
FIGS. 5A–5C are operation timing charts of a processing executing flag, a processing complete flag and an operation complete flag, respectively, in one embodiment of the present invention.

If the identity of a processing module 11 has been entered at step S303, an instruction has been provided to the processing module 11, and so program execution then progresses to step S402, where a check is made of the status of the PROCESSING COMPLETE flag 6c in order to determine whether or not that instruction has been completed, as seen in FIG. 5B. The PROCESSING COMPLETE flag 6c is set at a point 502 (FIG. 5B) when the data transmission from the processing module 11 is terminated as in the conventional process shown in FIG. 10. Flag 6c is automatically reset at point 505 after the sequence program has completed two cycles.

If the PROCESSING COMPLETE flag 6c has not yet been set at step S402, the execution progresses to step S403, which checks the OPERATION COMPLETE flag 6f. If the flag has not yet been set, step S403 judges that data transmission from the processing module 11 to the central data processing module 4 is not yet complete and terminates the END processing at step S409 without any operation.

If it is determined that the PROCESSING COMPLETE flag 6c has been set at step S402, program execution progresses to step S404, which checks the OPERATION COMPLETE flag 6f. If it is determined that that flag has not yet been set, the execution progresses to step S405, which sets the OPERATION COMPLETE flag 6f at point 503 in FIG. 5C, immediately following the setting of the PROCESSING COMPLETE flag 6c at point 502. Step S406 resets the PROCESSING EXECUTING flag 6b at point 504 as shown in FIG. 5A, and terminates the operation at step S409.

If the OPERATION COMPLETE flag 6f has been set at step S404, then the execution is terminated at step S409 without any operation.

If a reset of the PROCESSING COMPLETE flag 6c at step S402 had caused the execution to progress to step S403, which then determined that the OPERATION COMPLETE flag 6f was already set, the execution next progresses to step S407, which resets the OPERATION COMPLETE flag 6f at a point 506 subsequent to the point 505 as shown in FIGS. 5B and 5C. Execution then progresses to step S408, which erases the communication information of the processing module 11 from the communication entry memory 9a and terminates the END processing at step S409.

It will be evident that several slave stations 3A–3N may be used instead of one slave station 3 pictured in FIG. 1, and several processing modules 11 may also be used.

It will also be appreciated that data transmission may be made from the master station 1 to the slave station 3, using an instruction MRTOP, in addition to the data transfer from the slave station 3 to the master station made by the MRFRP data link instruction in the above embodiment.

It will further be appreciated that one memory may be used as both the communication entry memory 9a and the operation complete flag address memory 9b instead of the two provided separately in the above embodiment.

It will be apparent that the invention, as described above, achieves a programmable controller controlling process which ensures ease of program creation by removing interlock processing from the sequence program. A programmable controller acting as a master station and transferring data to and from one or more slave stations can thus be more effectively operated.

What is claimed is:

1. A method of controlling the communication between a master station and a plurality of slave stations, comprising the steps of:

using a programmable controller acting as a master station and comprising an operation processor for executing a sequence program cyclically, an operation complete flag memory for storing an operation specified by a data link instruction included in said sequence program, an operation complete flag address memory provided in correspondence with each slave station for storing address information of said operation complete flag memory, and a communication entry memory provided in correspondence with each slave station for entering communicating information indicating that communication is being made with one of the slave stations, the data link instruction being interlocked during its execution by processing complete and processing executing flags stored at addresses dependent on the system hardware configuration, the using step comprising the sub-steps of:

recording the address information of said operation complete flag memory specified in said sequence program into said operation complete flag address memory corresponding to said one slave station, and entering said communicating information into said communication entry memory corresponding to said one slave station, executing said data link instruction in order to transfer data between said one slave station and said master station, setting a flag at a corresponding address in said operation complete flag memory in accordance with address information recorded in said operation complete flag address memory on completion of the operation specified by said data link instruction, and resetting the flag of said operation complete flag memory, and erasing said communicating information entered in said communication entry memory after execution of at least one cycle of said sequence program whereby processing of the complete and processing executing flags can be easily performed despite being stored at addresses dependent on the system hardware.

2. The method of claim 1 further comprising checking said operation complete flag memory for an operation complete flag indicating the completion of said data link instruction.

3. The method of claim 2 wherein said checking is performed by executing an instruction in said sequence program that references an operation complete flag stored in said memory.

4. A method of controlling the communication between a master station and a plurality of slave stations, comprising the steps of:

using a programmable controller acting as a master station and comprising an operation processor for executing a sequence program cyclically, wherein said program comprises plural instructions including at least one data link instruction specifying an operation for one of the slave stations and being interlocked during its execution by processing complete and processing executing flags stored at addresses dependent on a system hardware configuration, said using step comprising the sub-steps of:

(1) specifying in said data link instruction, address information corresponding to an operation complete flag address memory for storing an address of an operation complete flag memory location;

(2) storing in said operation complete flag address memory, the address of said operation complete flag memory location for storing an operation complete flag for said data link instruction;

(3) entering in a communication entry memory provided in correspondence with each slave station, communicating information indicating that communication is being made with one of the slave stations, (4) executing said data link instruction in order to transfer data between one of the slave stations and said master station, (5) setting a flag at a corresponding address in said operation complete flag memory in accordance with address information recorded in said operation complete flag address memory upon completion of the operation specified by said data link instruction, and (6) resetting the flag of said operation complete flag memory, and erasing said communicating information entered in said communication entry memory after execution of at least one cycle of said sequence program whereby processing of the complete and processing executing flags can be easily performed despite being stored at addresses dependent on the system hardware.

5. The method of controlling as defined in claim 4, wherein said processing complete flag is set after a data transfer is completed between said master station and a designated one of the plurality of slave stations.

6. The method of controlling as defined in claim 5, wherein said processing complete flag is automatically reset after a sequence program has run twice.

7. A system, comprising:

a programmable controller, acting as a master station in the system further including a plurality of slave stations and comprising a processor for executing a sequence program cyclically, said sequence program comprising a plurality of data link instructions, each instruction being interlock protected during its execution by processing complete and processing executing flags stored at addresses dependent on the system hardware configuration, said programmable controller comprising:

an operating system;

first memory means for storing a flag indication of a completion of an operation specified by a data link instruction included in said sequence program, second means provided in correspondence with each slave station for storing address information of said operation complete flag memory means, and third means provided in correspondence with each slave station for entering communicating information indicating that communication is being made with one of the slave stations, said operating system comprising a macro instruction means, responsive to completion of the operation started by said data link instruction for setting a flag in said operation complete memory and comprising means for resetting the flag of said operation complete flag memory, and for erasing said communicating information entered in said third means after execution of at least one cycle of said sequence program whereby processing of the complete and processing executing flags can be easily performed despite being stored at addresses dependent on the system hardware configuration.

* * * * *